Dec. 7, 1948.  J. D. McGEE  2,455,513
MANUFACTURE OF MOSAIC SCREENS
Filed Dec. 6, 1946
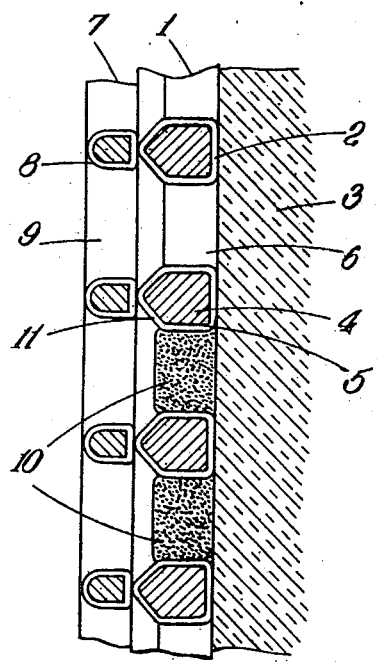
INVENTOR
JAMES DWYER McGEE
BY
ATTORNEY Patented Dec. 7, 1948

2,455,513

UNITED STATES PATENT OFFICE 2,455,513

MANUFACTURE OF MOSAIC SCREENS

James Dwyer McGee, London, England, assignor to Electric & Musical Industries Limited, Hayes, England, a company of Great Britain Application December 6, 1946, Serial No. 714,634
In Great Britain October 6, 1945

Section 1, Public Law 690, August 8, 1946
Patent expires October 6, 1965

7 Claims. (Cl. 117—33.2)

This invention relates to the manufacture of double-sided mosaic screens suitable for use in television transmitting and like tubes.

Various proposals have heretofore been made for producing double-sided mosaic screens and usually an insulated conducting mesh is provided, the interstices in the mesh being filled in a variety of ways with conducting elements which are exposed on each side of the mesh. The object of the present invention is to provide an improved method of filling the interstices of a mesh with conducting elements.

According to the present invention a method of manufacturing a double-sided mosaic screen is provided in which an insulated conducting mesh is covered at one side by a further mesh, leaving the interstices in the insulated mesh exposed, the interstices being closed at the other side of said insulated mesh by backing means, and metal to form the conducting elements of the mosaic screen is evaporated through said further mesh so as to become deposited in the interstices of said insulated mesh, said further mesh and backing means being then removed leaving the conducting elements in said insulated mesh and insulated from one another. The metal may be deposited so as to form metal cups lining the walls of the interstices or so as to form solid metal plugs. The backing means, usually constituted by a backing plate on which the insulated mesh is mounted, prevents the evaporated metal passing through the interstices of the insulated mesh.

In order that the said invention may be clearly understood and readily carried into effect, the same will now be more fully described with reference to the accompanying drawing in which a method of manufacturing a double-sided mosaic screen according to the invention is diagrammatically illustrated, by way of example.

Referring to the drawing a metal mesh 1 is provided, the mesh being insulated by a coating of insulating material 2 applied to the bars. The mesh is preferably produced by electro-deposition or, in the case of aluminium, by pressing from a master matrix, as described in the specification of co-pending patent application Serial Number 693,598, filed August 28, 1946, by Herbert E. Holman. Mesh 1 is provided with the insulating coating 2 in any suitable manner. It is then secured to a flat backing plate 3 which is preferably a transparent glass plate, the mesh being secured thereto by the use of a transparent cement. The side of the mesh to which the plate 3 is secured is preferably flat as shown, being formed by flat surfaces 5 on one side of the bars 4, the bars being ridged at the other side thereof as shown at 11 and the spaces between the bars constituting the interstices 6 of the mesh. Alternatively the mesh may be of the kind described in the specification of the above cited co-pending patent application Serial Number 693,598. After the mesh has been mounted on the backing plate, another mesh 7 forming a stencil, which is also preferably insulated by a coating of insulating material 8, and preferably produced from the same master matrix as the mesh mounted on said backing plate, but of considerably smaller shadow ratio as shown, is then applied to the mesh mounted on said backing plate 3 with the interstices 9 in the stencil meshes accurately aligned with the interstices 6 in the mesh 1. In order to effect proper alignment of the two meshes 1 and 7, a brightly illuminated diffusing screen may be mounted behind the meshes which produces shadow patterns when viewed through the meshes where they are not in register. The diffusing screen thus serves as a guide for preliminary alignment of the meshes as well as for providing illumination for subsequent microscopic observation for final alignment. The two meshes may first be aligned along their straight top edges the two being then temporarily secured in position as by the use of a suitable cement. The mesh with the smaller shadow ratio is then progressively applied to the mesh mounted on said backing plate and as they are brought into contact correct registration is checked by observation with a stereoscopic microscope and corrections made where necessary by means of a suitable probe. After alignment of the meshes has been effected they are transferred to a chamber which is evacuated and then a suitable metal is evaporated until the interstices in the mesh 1 secured to the backing plate 3 become filled to a suitable extent as indicated at 10 in the case of two of the interstices. It will be appreciated that during the evaporation process the stencil mesh prevents the deposition of metal on to the ridges 11, of the mesh 1 so that after the evaporation process is complete and the two meshes are separated, the mesh secured to the backing plate will be left with its interstices filled with conducting elements 10 with the insulated mesh exposed thus insulating the conducting elements from each other. Alternatively such an amount of metal may be evaporated that a thin coherent film of metal is formed on the backing plate at the bottom of the interstices which also extends some distance up the walls thereof. In this case the interstices 6 are left, after removal of the backing plate 3, with cups of metal, adhering to the walls of the interstices. The mesh 1 provided with conducting elements is then removed from its backing plate 3 by the use of a suitable solvent for the adhesive.

The mesh employed for manufacturing the mosaic screen may have a thickness of .002" and 200 meshes per linear inch, whilst the stencil mesh may have a thickness of .001" and 200 meshes per linear inch. However the meshes may be of identical dimensions, in which case the evaporation of metal is carried out at a suitable angle to the normal.

In order to help in aligning the meshes 1 and 7 and to maintain the two meshes in contact with one another during and after alignment it is preferred to apply a suitable potential difference between the meshes, for example, a potential difference of 500 to 1000 volts, so that the electrostatic attraction produced thereby serves to pull the stencil mesh 7 into close contact with the mesh 1 secured to the backing plate 3. The potential difference applied to the meshes can be so adjusted that initially the attraction between the two meshes is comparatively small so that the two meshes can be relatively adjusted during the alignment operation as described above. The meshes may be covered with a transparent insulating liquid to provide lubrication during the relative movement for alignment purposes, said liquid also serving to reduce the possibility of spark-over occurring on isolated points where the insulation of the meshes may be weak. The possibility of a spark-over is also reduced by insulating the stencil mesh 7, as already described. Of course to permit the application of said potential difference each mesh should have suitable leads connected to the metal of each mesh. Instead of employing a potential difference magnetic or electro-magnetic means may be used providing the stencil mesh is made of suitable magnetic material.

Various mechanical aids may also be employed for obtaining accurate registration of the two meshes. For example, in the case where the meshes are formed from matrices, a jig may be made by taking an accurate cast of the matrix in which the mesh is made in a transparent plastic material. The jig is thus complementary to the mesh. A mesh such as the mesh 1 is applied to the jig and fitted into the surface thereof and held in place by an electrostatic or magnetic field. Where an electrostatic field is employed a further electrode will be provided on the surface of the jig opposite to that in which the mesh is fitted. The mesh held in the jig is then secured by a suitable transparent adhesive, to the backing plate and caused to adhere to the surface thereof. The electrostatic or the magnetic field is then removed allowing the jig to be taken from the mesh. A stencil mesh such as the mesh 7 is then applied to the jig in a similar manner and held in position and aligned with the mesh already secured to the backing plate. When the two meshes are aligned they can be maintained in registration either mechanically or by electrostatic or magnetic force.

It may be difficult to maintain the potential difference between the two meshes after their alignment and during the transfer of the meshes to the chamber in which evaporation of the metal takes place and, accordingly, after aligning said meshes they may be held in register by clamping them together through the medium of a flat plate applied to the stencil mesh. When the assembly is mounted in the chamber and after evacuation of the latter, the potential may again be applied to said meshes and the clamp then removed before evaporation of said metal.

What I claim is:

1. A method of manufacturing a double-sided mosaic screen from an insulated conducting mesh, said method comprising the steps of, covering one side of said insulated mesh by a further mesh, leaving the interstices in the insulated mesh exposed, covering the other side of said insulated mesh by a backing means to close the interstices of said insulated mesh, evaporating metal through said further mesh to deposit conducting elements of the metal in the interstices of said insulated mesh, removing said further mesh and backing means from said insulated mesh to leave said conducting elements in said insulated mesh and insulated from one another.

2. A method according to claim 1 and including the step of, fitting said meshes in turn to a jig formed with grooves corresponding to the pattern of the meshes to align said meshes together with their interstices in registry.

3. A method according to claim 1, wherein said further mesh has a considerably smaller shadow ratio than said insulated mesh.

4. A method according to claim 1, and including the step of, holding said meshes in contact by establishing an electrostatic attraction between them.

5. A method according to claim 1 and including the step of, holding said meshes in contact by establishing a magnetic attraction between them.

6. The method of manufacturing a double sided mosaic screen from an insulated conducting mesh, said method comprising the steps of, covering one side of said insulated mesh by a further mesh, fitting said meshes in turn to a jig formed with grooves corresponding to the pattern of the meshes to align said meshes together with their interstices in registry, mechanically clamping said meshes together after they have been aligned, transferring said clamped meshes to an evaporating chamber in which metal evaporation is effected, covering the other side of said insulated mesh by a backing means to close the interstices of said insulated mesh, establishing electrostatic attraction between said meshes in said chamber so that the mechanical clamping means may be removed to avoid interference thereby in the evaporating process, evaporating metal through said further mesh to deposit conducting elements of the metal in the interstices of said insulated mesh, removing said further mesh and backing means from said insulated mesh to leave said conducting elements in said insulated mesh and insulated from one another.

7. The method of manufacturing a double sided mosaic screen from an insulated conducting mesh, said method comprising the steps of, covering one side of said insulated mesh by a further mesh, fitting said meshes in turn to a jig formed with grooves corresponding to the pattern of the meshes to align said meshes together with their interstices in registry, mechanically clamping said meshes together after they have been aligned, transferring said clamped meshes to an evaporating chamber in which metal evaporation is effected, covering the other side of said insulated mesh by a backing means to close the interstices of said insulated mesh, establishing magnetic attraction between said meshes in said chamber so that the mechanical clamping means may be removed to avoid interference thereby in the evaporating process, evaporating metal through said further mesh to deposit conducting elements of the metal in the interstices of said insulated mesh, removing said further mesh and backing means from said insulated mesh to leave said conducting elements in said insulated mesh and insulated from one another.

JAMES DWYER McGEE.

REFERENCES CITED

The following references are of record in the file of this patent:

UNITED STATES PATENTS

| Number | Name | Date |
| --- | --- | --- |
| 2,045,984 | Flory | June 30, 1936 |
| 2,162,808 | Gallup | June 20, 1939 |
| 2,175,701 | Rose | Oct. 10, 1939 |